May 3, 1938.   D. THOMA   2,115,890
HYDRAULIC TURBINE GOVERNOR
Filed March 21, 1936   3 Sheets-Sheet 1

Inventor
Dieter Thoma
by Karl... 
Atty

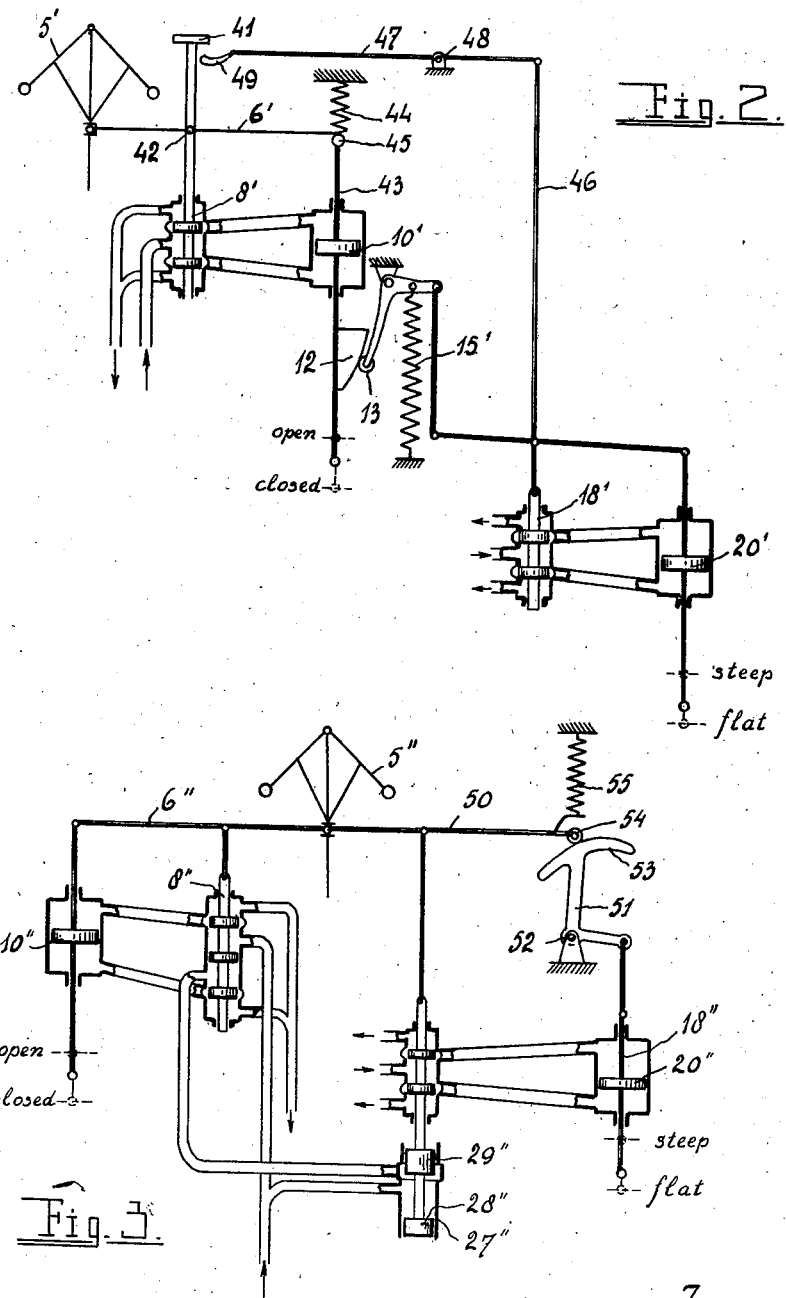

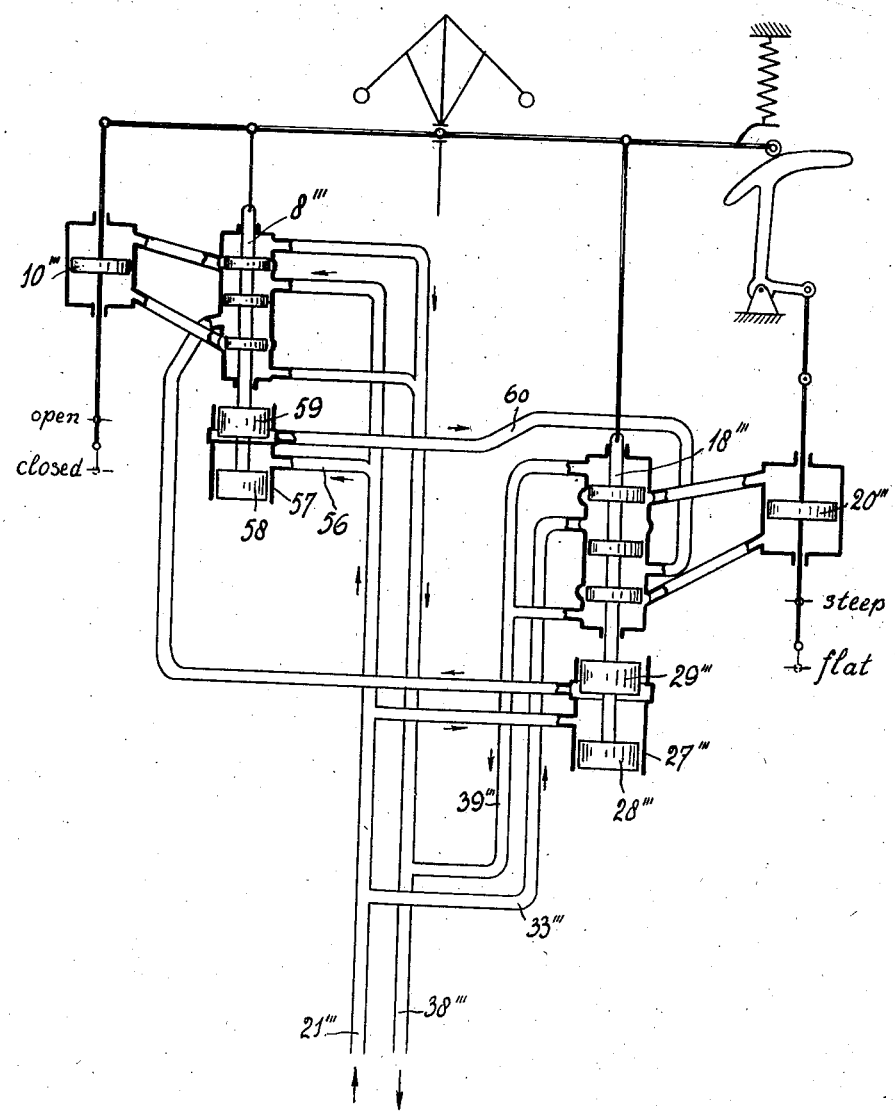

Patented May 3, 1938

2,115,890

UNITED STATES PATENT OFFICE 2,115,890

HYDRAULIC TURBINE GOVERNOR

Dieter Thoma, Munich, Germany

Application March 21, 1936, Serial No. 70,067
In Germany April 1, 1935

18 Claims. (Cl. 253—143)

This invention relates to turbines, and more particularly to governors for turbines having adjustable vanes such as Kaplan-turbines and the like.

It is an object of the present invention to reduce or even eliminate the obnoxious deviation of the control members governing the guide and runner mechanisms from their correlated positions.

It is a further object of the invention to provide a turbine governor which is adapted to change the proportion between the speed of the control member for the guide vanes and the speed of the control member for the runner vanes in such a manner that this proportion is greater for small outputs of the turbine than for larger outputs.

Other objects, and the manner in which the same are attained, will appear from the following description.

Governors for turbines of the kind having adjustable vanes customarily are provided for governing the various vane mechanisms into correlated positions. In particular, double governors for Kaplan-turbines have been designed in which the control members adjusting the guide vane and runner vane mechanisms, respectively, are provided as two servomotor pistons, i. e. the guide vane piston and the runner vane piston. In the state of equilibrium, there exist "correlated" positions of the guide vane and runner vane mechanisms, which at a given output of the turbine each time yield the highest efficiency. The position in which the guide vanes are completely opened, corresponds to a steep position of the runner vanes, while the position in which the guide vanes are least opened corresponds to a flat position of the runner vanes; the details of that correlation being determined, in advance, by means of tests on the turbine or a model thereof.

After sudden changes of load deviations from the correlation of the control members occur during the governing process. Such temporary deviation, after sudden decreases of load, frequently has been intended with the known designs of governors of this kind: the greatest closing speed of the runner vane piston (i. e. the highest rate at which the runner vanes may be brought from steeper into flatter positions) intentionally has been made especially small for the purpose of the equalization of output being effected, at a sudden decrease of load, first primarily by means of the guide vanes, the resulting decrease of the efficiency of the turbine having certain advantages for the governing process.

However, with increases of load no such deviation of the control members from their correlated positions is intended, since in this case the efficiency of the turbine must be maintained as high as possible also during the governing process. The present invention is based upon the recognition, that after increases of load a considerable deviation, in particular an advance, of the guide vane piston from that position, which is correlated with the corresponding position of the runner vane piston is even extremely disadvantageous. This disadvantage is a consequence of the hydraulic characteristics of turbines such as Kaplan-turbines. If proceeding from a stage of operation where the guide vanes and the runner vanes are in their correlated positions, the guide vanes are opened without the position of the runner vanes being altered simultaneously, the discharge of the turbine increases, while the efficiency is reduced. Hereby the output of the turbine firstly increases; however, when the guide vanes are opened to such an extent that the position correlated with the position of the runner vanes is considerably surpassed, the output will decrease, since then the reduction of the efficiency matters more than the increase of the discharge.

These conditions cause the turbine to react on increases of the load as follows: When during the governing process the position of the guide vanes correlated with the present position of the runner vanes is considerably exceeded, the speed of the turbine decreases in an accelerated manner on account of the reduction of the turbine output, whereupon the centrifugal governor will displace the valve of the guide vane servomotor still further inducing the guide vanes to be opened still faster, and so on. In this manner an unstable process occurs, the guide vanes being governed into the position where they are completely opened. This process occurs even in a case where the load on the turbine, after the increase of load has taken place, is considerably smaller than the maximum output of the turbine. When this has happened, the equalization of output is obtained only when also the runner vanes are opened to a large extent; then, however, both control members are opened to a much higher degree than is actually required. Therefore, subsequently considerable closing movements of the two servomotor pistons become necessary for the purpose of adjusting the turbine output, which has been increased much above the amount required, to the output actually called for. Consequently, the instability occurring during the governing process in cases of the kind aforesaid leads to great speed changes even when only relatively small increases of load on the turbine occur.

Conditions of a similar nature, though not followed by quite as important an influence on the operation of the turbine, are encountered where the runner vane piston advances relatively to the correlated position of the guide vane piston. However, since for reasons of the constructive design a high speed of the runner vane piston is less readily obtainable than is the case for the guide vane piston, and in view of the fact that with various designs of turbine governors known in the prior art an advance of the runner vane piston is prevented by the particular mode of control, it is mostly the advance of the guide vane piston, which, under certain conditions, is responsible for the unfavorable operation of the governor.

In the prior art, efforts have been made to avoid the deviation of the control members from their correlated positions with the quick governing movements required after increases of load by suitably fixing the highest opening speeds which the two power pistons may attain. As a rule the highest speed, which the runner vane piston may attain, is somewhat limited for reasons of the constructive design, since the servomotor is situated in the rotating shaft, while with the guide vane piston limitations of this kind do not exist. Consequently the mode of correlating one power piston with the other, most frequently used in the prior art, consisted in artificially reducing the highest possible opening speed of the guide vane piston by means of a throttling device provided in the circuit of the pressure oil.

However, in this manner a perfectly satisfactory solution of the problem has not been achieved. The dependency of the maximum opening speeds upon the varying resistances of the guide and runner vanes and upon the viscosity of the oil varying for varying temperatures results in variations of the highest speeds. Further, in order to maintain the correlation of the servomotor pistons over the entire governing range, the proportion between the opening speeds of the two servomotor pistons must not be invariable. For, in the range of small turbine outputs the proportion $$\frac{\text{opening speed of the guide vane piston}}{\text{opening speed of the runner vane piston}}$$

must be greater than in the range of large turbine outputs.

With constant load or very slowly changing load the runner vane piston, after a small deviation has taken place, is always governed into the position correlated with the position of the guide vane piston. In how far this correlation can be maintained during the governing process after a sudden increase of load, depends upon the amount of the increase of load. With small increases of load only small adjusting speeds are prescribed for the runner vane piston, therefore the servomotor valve is displaced only little from its normal position, thus remaining in the range of its useful stroke, for which the amount of oil per second passing through the same is determined essentially only by the resistances to flow occurring at the governing edges of the valve. Since even a small displacement of the valve induces a relatively considerable speed of the servomotor piston, the position, into which the runner vane piston is governed each time during the adjusting movement, corresponds sufficiently accurately to the position correlated with the position of the guide vane piston prevailing at that instant.

However, with considerable variations in the load on the turbine great deviations occur. The guide vane piston moves quickly and the speed, which the runner vane piston should adopt in order to remain each time in its correlated position, is higher than the highest speed which its valve may produce; a particular limitation of that speed being caused by the resistances to flow in the pipes connecting the valve with the servomotor, which pipes, with numerous turbine constructions, are located partly in the interior of the turbine shaft and therefore cannot be made as large as would be required. Consequently, with large increases of load the valve of the runner vane servomotor is displaced beyond the range of its useful stroke, without thereby being obtained a considerable increase of the speed of the runner vane piston, so that the runner vane piston remains far behind the positions correlated to the positions of the guide vane piston. Thus the disturbance of the governing process, above referred to occurs.

According to the present invention at least one of the control mechanisms for the runner and guide vanes is provided with means for influencing the other control mechanism in dependency upon that first control mechanism.

In particular, the invention contemplates that the control mechanism for the guide vanes and especially the valve controlling the guide vane piston is provided with a shut-off mechanism which slows down, or even completely prevents, the opening movement of the guide vane piston whenever the guide vanes are open to considerably larger an extent than corresponds to their correlation with the position of the runner vanes prevailing at that instant. In this manner, whenever speedy governing movements occur after a sudden increase of load on the turbine, the guide vane piston is forced to wait until the runner vane piston has followed.

In the drawings affixed to this specification and forming part thereof, several embodiments of my invention are illustrated diagrammatically by way of example.

In the drawings,

Fig. 2 illustrates somewhat diagrammatically another embodiment of the invention, Fig. 3 shows diagrammatically another embodiment of the invention provided in a governor of a type differing from that shown in Figs. 1 and 2, and Fig. 4 illustrates a further embodiment of the invention provided in that type of governor shown in Fig. 3.

Figure 1:
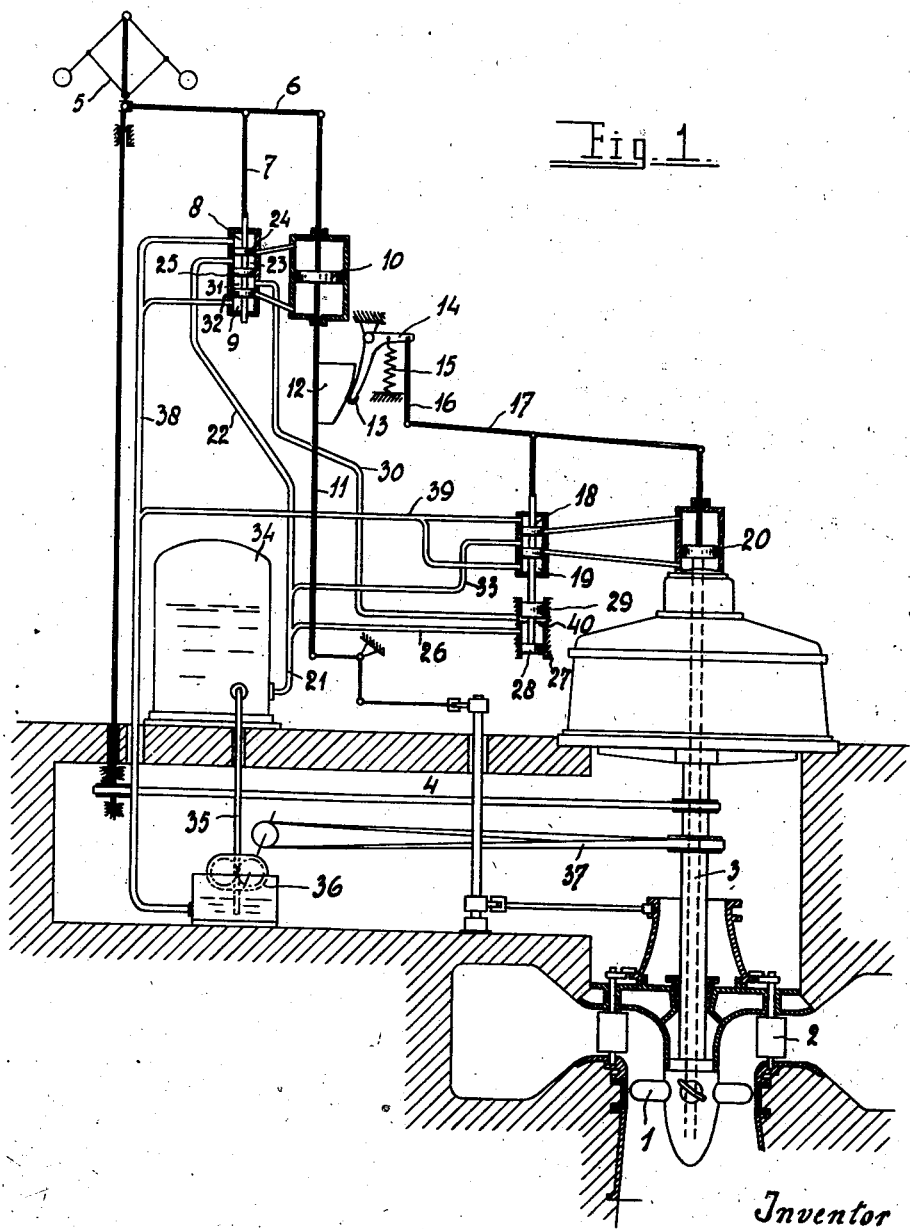
Fig. 1 is a diagrammatic elevation of one embodiment of the invention provided on a Kaplan-turbine.

Referring now to the drawings and more especially to Fig. 1, I are the runner vanes and 2 the guide vanes of a Kaplan-turbine. The hollow turbine shaft 3 drives, through connecting means 4, the centrifugal governor 5 to which the restoring lever 6 is connected. The restoring lever 6 actuates, through connecting rod 7, the governing valve 8 provided in the body 9 connected with the guide vane servomotor with piston indicated at 10, the piston rod 11 of which is indirectly connected with the guide vanes 2 in such way that the vanes are being closed when the piston moves downwardly. The piston rod 11 carries a cam body 12 which supports a roller 13 mounted on one arm of the bell crank lever 14 and pressed, by means of the spring 15, onto the surface of the cam body 12. The other arm of the bell crank lever 14 carries connecting rod 16 which in turn is connected with the floating lever 17 carrying the governing valve 18 provided in the body 19 for the runner vane servomotor with piston 20. This piston is connected with the runner vanes in such way that by a downward movement of the piston the runner vanes are closed.

The pressure oil is supplied to the valve body 9 through the piping indicated at 21 which is divided in two branches: the pipe 22 supplies oil to the space 23 between the pistons 24 and 25, while the other branch 26 of the piping 21 leads to a shut-off valve indicated at 27, in which a packing piston 28 and a control piston 29 operatively connected with the piston rod of the governing valve 18 are arranged, and from which the oil passes, through a pipe 30, into the space 31 between the pistons 25 and 32 of valve 8.

A pipe 33 connects the valve body 19 with the oil supply piping 21, which in turn is connected to an air chamber 34 supplied with oil, through a pipe 35, from a gear pump 36, which is driven, through a connection 37, from the shaft 3 of the turbine. Pipings 38 and 39 are designed for discharging the oil from the valve bodies 9 and 19, respectively, into the pump 36.

The shape of the cam body is so chosen that in the normal positions of the two valves, i. e. in the state of equilibrium, the two servomotor pistons always occupy correlated positions. Fig. 1, as well as the other figures, illustrate the operative conditions prevailing in the state of equilibrium where the guide vane piston is in its medium position. Since in the range of smaller outputs a small displacement of the guide vane piston is correlated with a smaller displacement of the runner vane piston than would be required in the range of larger outputs, the runner vane piston is not located at about half of its stroke, but in a position closer to the final "flat" position.

In the operation of the governor according to Fig. 1 the branch 22 of the oil supply pipe which leads into the space 23 in the valve gear serves for supplying pressure oil when the guide vanes are to be closed, the closing movement being started by an upward displacement of the valve gear generally indicated at 8. When the guide vanes are being opened, i. e., with a downward displacement of valve 8, pressure oil is supplied from the space 31.

With a normal position of the valve 18 and also still with small displacements of the same from that normal position, there exists between the governing, lower edge of the control piston 29 and the controlling edge 40 on the body 27 a cross section sufficiently large as not to obstruct the flow of oil in the pipe 30. With a greater displacement of the valve 18 downwardly from the normal position, which occurs according to the above statements, as soon as the runner vane piston 20 does not follow sufficiently the opening movement of the guide vane piston, the flow of oil in the pipe 30 is throttled or even altogether prevented by means of the controlling edges on the piston 29 and body 27. The opening movement of the guide vane piston is slowed down or altogether prevented until the runner vane piston has followed and has again caused the valve 18 to approach its normal position by means of the floating lever 17.

The shut-off valve provided in the mechanism governing the guide vane piston according to the present invention may be replaced by means which, instead of influencing the oil supply, act onto the valve of the guide vane servomotor itself.

Fig. 2 shows an example for a governor of that type of turbine governors shown in Fig. 1 provided with such means exerting a direct action onto the valve of the guide vane piston. The piston rod of the governing valve 8' for the guide vane is extended upwardly and carries the stop 41. The restoring lever 6' is linked, at the point 42 to the piston rod of the governing valve 8', while the right end of the restoring lever 6' is connected with the piston rod 43 of the guide vane piston 10' only by being pressed, by means of a spring 44, onto a roller 45 carried by piston rod 43. The pressure of the spring 44 is adapted to safely overcome the resistances to movement of the governing valve 8'. The governing valve 18' is connected by means of a link 46 to the right end of a lever 47 which turns about the point 48. The left end of the lever 47 is provided with a stop 49, which cooperates with the stop 41 provided on the piston rod of valve 8'.

In the operation of the governing mechanism according to Fig. 2, with both the governing valves being in their normal position, the stop 49 is situated so far away from the stop 41 that the stops meet only when both governing valves are displaced downwardly until they have reached the limit of the range of useful stroke. With small variations of load on the turbine the stop does not exert its action. However, if after a great increase of load the runner vane piston 20' remains considerably behind the position correlated with the position of the guide vane piston, and therefore the governing valve 18' is displaced downwardly beyond the range of useful stroke, the stop 49 meets the stop 41. Hereby the right end of the lever 6' is lifted opposing the action of the spring 44, from the stop 45 and the governing valve 8' is brought from below near its medium position. Hereby the opening movement of the guide vane piston 10' is slowed down or even prevented altogether. Of course, one condition for the correct operation of the locking mechanism according to Fig. 2 requires that, taking into account the ratios of the levers, the spring 15' is considerably more powerful than the spring 44, in order to prevent the roller 13' from being lifted from the cam body 12' when the stops 49 and 41 meet.

The invention may also be adapted to be used in governing systems having somewhat less favorable characteristics but being possible in principle, in which the runner vane piston is governed by the centrifugal governor, while the guide vane piston is governed by the runner vane piston. Figs. 1 and 2 illustrate governors of this type if one considers, contrary to the view hitherto taken, the servomotor piston 10 or 10' as being connected with the runner vane mechanism and the servomotor piston 20 or 20' as being connected with the guide vane mechanism, the action of those pistons consequently being exchanged. In that case the locking mechanism would prevent an advance of the runner vane piston relative to the position correlated with the position which the guide vane piston occupies at that instant.

The invention may also be used with double governors, the general arrangement of which deviates from that indicated e. g. in Fig. 1.

Fig. 3 illustrates a governor according to the invention, in which the two servomotor pistons are governed directly by the centrifugal governor. In this case the invention contemplates to influence the oil supply in a manner somewhat similar to that illustrated in Fig. 1. The centrifugal governor 5" governs by means of the restoring lever 6" the governing valve 8" of the guide vane piston 10" and governs also by means of the restoring lever 50 the governing valve 18" of the runner vane piston 20". The transmission of the movement of the runner vane piston onto the restoring lever 50 is effected by means of a bell crank lever 51 turning about point 52 and carrying the cam surface 53, which supports the roller 54 mounted on the right end of the lever 50 and pressed onto the cam surface 54 by means of a spring 55. The shape of the cam surface 54 is so chosen, in a well known manner, that in the state of equilibrium and with slow governing movements the desired correlation is obtained. When, however, with the quick opening movements after great increases of load, the runner vane piston 20" remains behind the position correlated with the position of the guide vane piston 10", the governing valve 18" is displaced from its normal position downwardly to such an extent that the shut-off valve indicated at 27", 28" and 29" checks the opening movement of the guide vane piston in the manner described with reference to Fig. 1. The correct operation of a governor according to Fig. 3 depends upon the condition that the governing valve for the guide vane piston as well as the oil pipes leading thereto are provided with dimensions sufficiently large so that the guide vane piston may never be that piston which remains behind the position correlated with the position of the other piston. In most of the cases it is possible to provide for such favorable dimensions.

In cases where proper dimensions cannot be provided for, the present invention contemplates to provide a mechanism of the kind illustrated in Figs. 1 to 3 also in the governing mechanism for the runner vane piston. Fig. 4 illustrates a governor in which both the governing valves for the guide vane piston and for the runner vane piston are provided with shut-off valves, the shut-off valve actuated by the governing valve for the guide vane piston slowing down the opening movement of the runner vane piston whenever the guide vane piston remains behind.

Fig. 4 illustrates a governor of the type shown in Fig. 3 in which two shut-off valves are provided, each valve being operatively connected with one of the governing valves and controlling the supply of oil to the other governing valve. Thus, in addition to the shut-off valve 27''', 28''' and 29''' connected with governing valve 18''' and controlling the supply of oil to governing valve 8''' as described with reference to Fig. 3, a shut-off valve having a body 57, a packing piston 58 and a control piston 59 is operatively connected with the governing valve 8''' and provided for controlling the supply of oil to governing valve 18''' through pipes 56 and 60.

In the operation of a governor according to Fig. 4, the shut-off valve 57, 58, 59 enters into action whenever the governing valve 8''' for the guide vane piston is displaced downwardly beyond the useful stroke. Otherwise the operation of this governor is similar to that described with reference to Fig. 3.

It is obvious that either one or both of the shut-off valves according to Fig. 4 may be replaced by other shut-off mechanism, e. g. the stop mechanism according to Fig. 2.

Numerous advantages are obtained with the novel governors according to the present invention. The deviation of the control members from their correlated position and in particular the deviation, after an increase of load, of the guide vane piston from the position correlated with the position of the runner vane piston, is substantially eliminated while the proportion between the opening speed of the guide vane piston and the opening speed of the runner vane piston is maintained greater in the range of small turbine outputs than in the range of large turbine outputs. The novel governor does not only prevent the guide vane piston from unduly advancing relative to the position correlated with that of the runner vane piston, but permits also of preventing an advance of the runner vane piston relative to the position correlated with that of the guide vane piston, and of combining both measures in such a manner that neither one of the control members can advance relative to the position correlated with that of the other.

Various changes may be made in the details disclosed in the foregoing specification without departing from the invention or sacrificing the advantages thereof.

I claim:—

1. A turbine comprising in combination an adjustable runner mechanism, an adjustable guide mechanism associated therewith, a control member operatively connected with said runner mechanism, another control member operatively connected with said guide mechanism, and means for governing said control members into correlated positions, said means comprising mechanism adapted to check the opening movement of one control member in dependency upon the amount about which the other control member lags behind the position correlated to the position which the first control member occupies at that instant.

2. A turbine comprising in combination an adjustable runner mechanism, an adjustable guide mechanism associated therewith, a pressure medium controlled control member operatively connected with said runner mechanism, another pressure medium controlled control member operatively connected with said guide mechanism, and means for governing said control members into correlated positions, said means comprising mechanism adapted to check the supply of pressure medium for the opening of one control member in dependency upon the amount about which the other control member lags behind the position correlated to the position which the first control member occupies at that instant.

3. A turbine comprising in combination an adjustable runner mechanism, an adjustable guide mechanism associated therewith, a mechanical control member operatively connected with said runner mechanism, another mechanical control member operatively connected with said guide mechanism, and means for governing said control members into correlated positions, said means comprising mechanism adapted to mechanically check the opening movement of one control member in dependency upon the amount about which the other control member lags behind the position correlated to the position which the first control member occupies at that instant.

4. A turbine comprising in combination an adjustable runner mechanism, an adjustable guide mechanism associated therewith, a control member operatively connected with said runner mechanism, another control member operatively connected with said guide mechanism, and means for governing said control members into correlated positions, said means comprising mechanism associated with either control member and adapted to check the opening movement of the other control member in dependency upon the amount about which the first named control member lags behind the position correlated to the position which the other control member occupies at that instant.

5. A double-governor for turbines of the kind having adjustable guide and runner mechanisms comprising in combination mechanism responding to the speed of the turbine, a control member for the guide mechanism adapted to be influenced by said speed controlled mechanism, and governing mechanism for said control member, and a control member for the runner mechanism adapted to be influenced by said control member for the guide mechanism, and governing mechanism for said runner control member, and means associated with at least one of said control members and adapted to check the opening movement of the other control member in dependency upon the amount about which the first named control member lags behind the position correlated to the position which the other control member occupies at that instant.

6. A double-governor for turbines of the kind having adjustable guide and runner mechanisms, comprising in combination mechanism responding to the speed of the turbine, a pressure medium controlled control member for the guide mechanism adapted to be influenced by said speed controlled mechanism, and governing mechanism for said pressure medium controlled control member, and a control member for the runner mechanism adapted to be influenced by said control member for the guide mechanism, and governing mechanism for said runner control member, and means associated with at least one of said control members and adapted to check the supply of pressure medium for the opening of the governing mechanism for the other control member in dependency upon the amount about which the first named control member lags behind the position correlated to the position which the other control member occupies at that instant.

7. A double-governor for turbines of the kind having adjustable guide and runner mechanisms, comprising in combination mechanism responding to the speed of the turbine, a mechanical control member for the guide mechanism adapted to be influenced by said speed controlled mechanism, and governing mechanism for said mechanical control member, and a control member for the runner mechanism adapted to be influenced by said control member for the guide mechanism, and governing mechanism for said runner control member, and means associated with at least one of said control members and adapted to mechanically check the opening movement of the governing mechanism for the other control member.

8. A double-governor for turbines of the kind having adjustable guide and runner mechanisms, comprising in combination a centrifugal governor, a control member for the guide mechanism adapted to be influenced by said centrifugal governor, and governing mechanism for said control member, and a control member for the runner mechanism adapted to be influenced by said control member for the guide mechanism, and governing mechanism for said runner control member, and means associated with at least one of said control members and adapted to influence the other control member, said means comprising a shut-off valve connected with the governing mechanism for one control member and adapted to control the supply of pressure medium to the governing mechanism for the other control member.

9. A double-governor for turbines of the kind having adjustable guide and runner mechanisms, comprising in combination a centrifugal governor, a control member for the guide mechanism adapted to be influenced by said centrifugal governor, and governing mechanism for said control member, and a control member for the runner mechanism adapted to be influenced by said control member for the guide mechanism, and governing mechanism for said runner control member, and means associated with at least one of said control members and adapted to check the opening movement of the other control member in dependency upon the amount about which the first named control member lags behind the position correlated to the position which the other control member occupies at that instant, said means comprising a stop mechanism associated with the governing mechanism of one control member and adapted to coact with another stop mechanism associated with the governing mechanism of the other control member.

10. A double-governor for turbines of the kind having adjustable guide and runner mechanisms, comprising in combination mechanism responding to the speed of the turbine, a control member for the guide mechanism and another control member for the runner mechanism both adapted to be influenced by said speed controlled mechanism, and governing mechanisms for both said control members, and means associated with at least one of said control members and adapted to check the opening movement of the other control member in dependency upon the amount about which the first named control member lags behind the position correlated to the position which the other control member occupies at that instant.

11. A double-governor for turbines of the kind having adjustable guide and runner mechanisms, comprising in combination mechanism responding to the speed of the turbine, a pressure medium controlled control member for the guide mechanism and another pressure medium controlled control member for the runner mechanism both adapted to be influenced by said speed controlled mechanism, and governing mechanisms for both said control members, and means associated with at least one of said control members and adapted to control the supply of pressure medium for the opening of the governing mechanism for the other control member.

12. A double-governor for turbines of the kind having adjustable guide and runner mechanisms, comprising in combination mechanism responding to the speed of the turbine, a mechanical control member for the guide mechanism and another mechanical control member for the runner mechanism both adapted to be influenced by said speed controlled mechanism, and governing mechanisms for both said control members, and means associated with at least one of said control members and adapted to mechanically check the opening movement of the governing mechanism for the other control member in dependency upon the amount about which the first named control member lags behind the position correlated to the position which the other control member occupies at that instant.

13. A double-governor for turbines of the kind having adjustable guide and runner mechanisms, comprising in combination mechanism responding to the speed of the turbine, a control member adapted to be influenced by said speed controlled mechanism, a cam member associated with said control member, a mechanism arranged to be guided by said cam member and another control member associated with said mechanism, and means associated with at least one of said control members and adapted to check the opening movement of the other control member in dependency upon the amount about which the first named control member lags behind the position correlated to the position which the other control member occupies at that instant.

14. A double-governor for turbines of the kind having adjustable guide and runner mechanisms, comprising in combination mechanism responding to the speed of the turbine, a control member adapted to be influenced by said speed controlled mechanism, another control member adapted to be influenced by said centrifugal governor and means associated with said other control member and comprising a cam member and a mechanism adapted to be guided by said cam member arranged for transmitting a restoring movement from said second control member, and means associated with at least one of said control members and adapted to check the opening movement of the other control member in dependency upon the amount about which the first named control member lags behind the position correlated to the position which the other control member occupies at that instant.

15. A turbine governor for turbines of the kind having adjustable guide and runner mechanisms comprising in combination mechanism responding to the speed of the turbine, a pressure medium controlled control member for the guide mechanism adapted to be influenced by said speed controlled mechanism, and governing mechanism for said guide control member, and a pressure medium controlled control member for the runner mechanism adapted to be influenced by the control member of the guide mechanism, and governing mechanism for said runner control member, and means for governing said control members into correlated positions, said means comprising mechanism adapted to check the supply of pressure medium for the opening of the governing mechanism of the guide mechanism in dependency upon the amount about which said runner control member lags behind the position correlated with the present position of the guide control member.

16. A turbine governor for turbines of the kind having adjustable guide and runner mechanisms comprising in combination mechanism responding to the speed of the turbine, a mechanical control member for the guide mechanism adapted to be influenced by said speed controlled mechanism, and governing mechanism for said guide mechanical control member, and a control member for the runner mechanism adapted to be influenced by the control member of the guide mechanism, and governing mechanism for said runner control member, and means for governing said control members into correlated positions, said means comprising mechanism adapted to mechanically check the opening movement of the governing mechanism of the guide mechanism in dependency upon the amount about which said runner control member lags behind the position correlated with the present position of the guide control member.

17. A turbine governor for turbines of the kind having adjustable guide and runner mechanisms comprising in combination mechanism responding to the speed of the turbine, a pressure medium controlled control member for the runner mechanism adapted to be influenced by said speed controlled mechanism, and governing mechanism for said runner pressure medium controlled control member, and a control member for the guide mechanism adapted to be influenced by the control member of the runner mechanism, and governing mechanism for said guide control member, and means for governing said control members into correlated positions, said means comprising mechanism adapted to check the supply of pressure medium for the opening of the governing mechanism of the runner mechanism in dependency upon the amount about which said guide control member lags behind the position correlated with the present position of the runner control member.

18. A turbine governor for turbines of the kind having adjustable guide and runner mechanisms comprising in combination mechanism responding to the speed of the turbine, a mechanical control member for the runner mechanism adapted to be influenced by said speed controlled mechanism, and governing mechanism for said runner mechanical control member, and a control member for the guide mechanism adapted to be influenced by the control member of the runner mechanism, and governing mechanism for said guide control member, and means for governing said control members into correlated positions, said means comprising mechanism adapted to mechanically check the opening movement of the governing mechanism of the runner mechanism in dependency upon the amount about which said guide control member lags behind the position correlated with the present position of the runner control member.

DIETER THOMA.